US008931695B2

(12) United States Patent  
Barnes et al.

(10) Patent No.: US 8,931,695 B2  
(45) Date of Patent: Jan. 13, 2015

(54) SECURE VOTING VIA MULTIMEDIA PROCESSING RESOURCES

(75) Inventors: Bruce Barnes, Pingree Grove, IL (US); Wayne Robert Heinmiller, Elgin, IL (US); Nikhil S. Marathe, Roselle, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1073 days.

(21) Appl. No.: 12/275,967

(22) Filed: Nov. 21, 2008

(65) Prior Publication Data

US 2010/0127064 A1  May 27, 2010

(51) Int. Cl.
- G06K 17/00 (2006.01)
- G07C 13/00 (2006.01)
- H04M 3/42 (2006.01)
- H04L 29/08 (2006.01)

(52) U.S. Cl.
CPC ............ *G07C 13/00* (2013.01); *H04M 3/42* (2013.01); *H04L 67/12* (2013.01); *H04L 67/18* (2013.01); *H04M 2203/1041* (2013.01); *H04M 2242/30* (2013.01)
USPC ........................................ 235/386

(58) Field of Classification Search
USPC ............................................ 235/386; 705/12
See application file for complete search history.

(56) References Cited

U.S. PATENT DOCUMENTS

| | | | |
|---|---|---|---|
| 5,719,619 A * | 2/1998 | Hattori et al. | 725/24 |
| 7,237,717 B1 * | 7/2007 | Rao et al. | 235/386 |
| 2003/0023478 A1 * | 1/2003 | Piccionelli | 705/12 |
| 2003/0149616 A1 * | 8/2003 | Travaille | 705/12 |
| 2004/0149825 A1 | 8/2004 | Griffin | |
| 2005/0043988 A1 * | 2/2005 | Illsley et al. | 705/12 |
| 2005/0123120 A1 * | 6/2005 | Creamer et al. | 379/220.01 |
| 2008/0072064 A1 | 3/2008 | Franchi | |
| 2008/0277470 A1 | 11/2008 | Gallaher et al. | |

* cited by examiner

*Primary Examiner* — Christopher Stanford
(74) *Attorney, Agent, or Firm* — Jackson Walker L.L.P.

(57) ABSTRACT

A voting server receives votes from a multimedia processing resource (MPR) and executes instructions for determining whether a user location is an approved voting location and determining whether an MPR communication path is an approved path. If the user location is an approved voting location and the MPR communication path is an approved path, ballot data is accessed, a ballot based on the ballot data is presented to a user, and user input is accepted to select an element from the ballot.

10 Claims, 3 Drawing Sheets

SECURE VOTING VIA MULTIMEDIA PROCESSING RESOURCES

BACKGROUND

1. Field of the Disclosure

The present disclosure generally relates to content delivery networks and more particularly to secure voting via a multimedia processing resource communicatively coupled to a content delivery network.

2. Description of the Related Art

Voters traditionally visit polling places to participate in government elections. At the polling places, the identities of the voters may be verified using picture identification cards. Voting that is remote from the polling places may be conducted.

DESCRIPTION OF EXEMPLARY EMBODIMENTS

Figure 1:
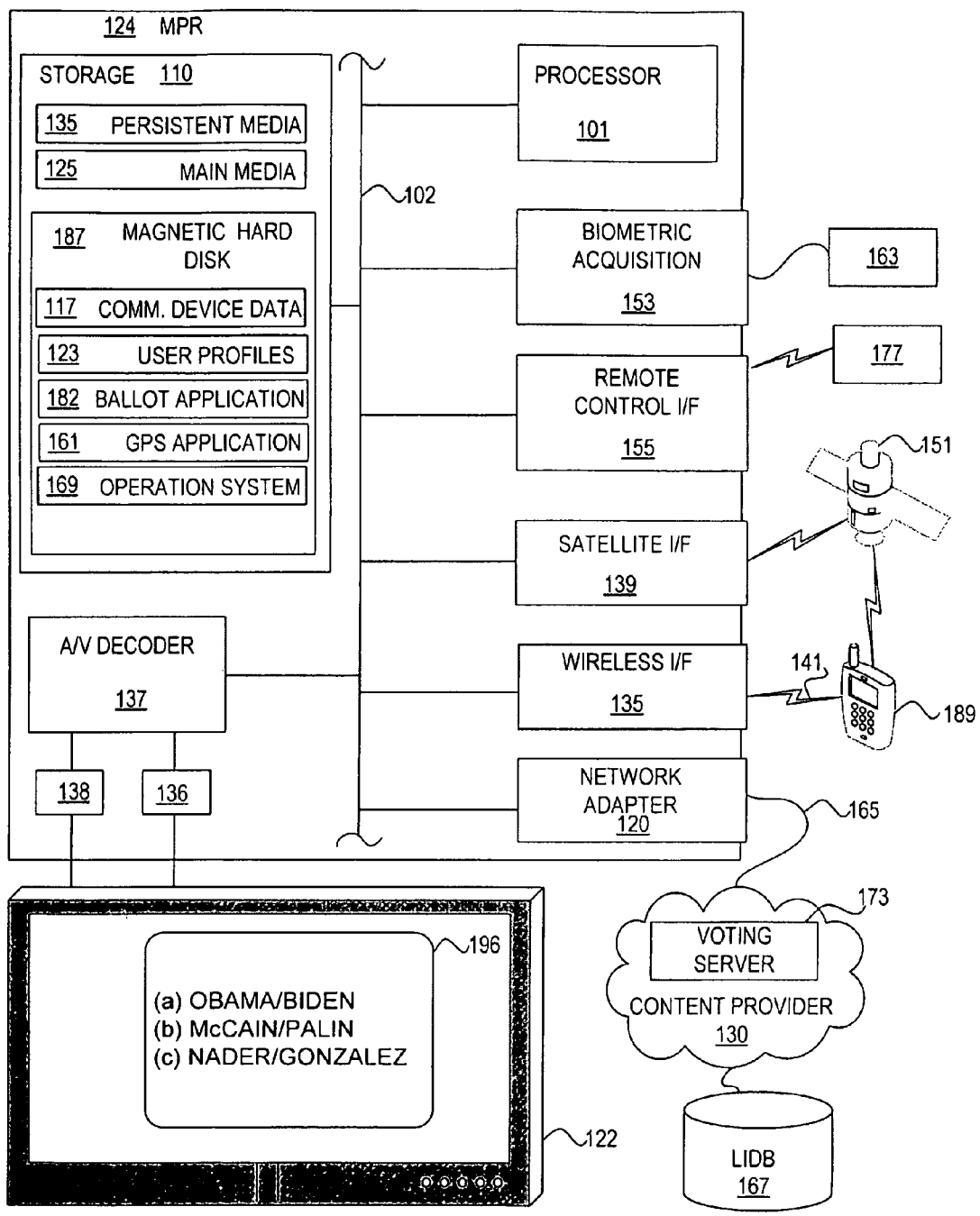
FIG. 1 illustrates an exemplary multimedia processing resource for conducting secure voting in accordance with disclosed embodiments.

Disclosed embodiments provide secure and auditable voting via a multimedia processing resource (MPR) such as a set-top box (STB). This allows interaction between users and content providers that enables voting for political candidates from the users' homes in a secure way that validates specifically who is voting, who or what they are voting for, and that only one vote per person is registered. In addition to enabling secure voting in government elections, disclosed embodiments may be used for interactive participation in television game shows, voting for a favorite contestant in a reality show, and participating in all levels (e.g., nationwide or citywide) of political voting in a secure way using landlines or cellular wireless technology to validate the authenticity of a voter.

In one aspect, a disclosed voting server receives votes from an MPR and executes instructions for determining whether a user location is an approved location and determining whether an MPR communication path is an approved path. Determining whether the MPR communication path is an approved path may include validating that an indicator for a portion of the MPR communication path is stored in a line information database (LIDB), which may be a wireless or wireline database. Determining whether the MPR location is an approved location may include receiving an indication that an approved mobile telephony device is within a predetermined proximity of the MPR. This may include using a localized protocol (e.g., Bluetooth or WiFi) that provides an indication of whether the mobile telephony device is in relative proximity to the MPR. If the user location is an approved location and the MPR communication path is an approved path, the voting server executes instructions for accessing ballot data, presenting a ballot based on the ballot data to a user, and accepting a user input to select an element from the ballot. In some embodiments, the voting server executes instructions for determining whether a user identity is valid, for example, by validating textual login credentials provided by the user to a mobile telephony device. In addition, biometric data may be received from the user to verify whether the user identity is valid. As further means of voter identity verification, an MPR location may be verified as an approved voting location for the user.

In another aspect, a disclosed MPR includes a network interface for communicating with a content provider over a communication path associated with an LIDB identifier. The disclosed MPR also has a wireless interface for receiving location data to determine whether a user location is an approved voting location and has a ballot module for presenting a ballot to the user. The MPR further includes a remote control interface for accepting user input to select elements from the ballot. In some embodiments, the MPR further includes a satellite interface for determining whether a location of the multimedia processing resource is an approved voting location. A voter profile module may be stored on or accessed by the MPR to verify the user as an approved voter. The MPR may further include a communication device data module for verifying whether a mobile telephony device associated with the user is local to the MPR.

In still another aspect, a disclosed service accepts votes from an MPR in response to a voting server determining that an MPR communication path is an approved path and determining that a user location is an approved voting location. The MPR presents a ballot to a user and accepts user input to select at least one element from the ballot. In some embodiments, the service further includes detecting whether a user location is local to the MPR and determining whether the MPR location is a designated voting location for the user.

In the following description, examples are set forth with sufficient detail to enable one of ordinary skill in the art to practice the disclosed subject matter without undue experimentation. It should be apparent to a person of ordinary skill that the disclosed examples are not exhaustive of all possible embodiments.

Disclosed embodiments promote secure voting using more than one level of validation including location verification of the user (i.e., a potential voter), location verification the MPR used to receive or process the votes, and location verification of a communication device within a predetermined proximity to the MPR. In addition, a communication path used by the MPR (e.g., an STB) or the communication device (e.g., a mobile telephone) may be verified using data accessed from an LIDB, for example. In an example scenario, if an MPR communicates with a content provider through a digital subscriber line, the content provider (e.g., a multimedia content distribution network) may access data for the subscriber line from an LIDB to determine whether a user is an approved voter for that line.

In addition to validating whether a potential voter is an approved voter by analyzing whether the potential voter is communicating over an approved communication path, other methods of validation may be used. In some embodiments, voter credentials may be provided to an MPR, for example, to allow the voter to login to a voting server to access a ballot. Voter credentials may include a voter identification number, a Social Security number, a driver's license number, a date of birth, a password, a personal identification number (PIN) and other such information. The voter credentials may be stored on an MPR local to the user (i.e., potential voter) or may be stored on a network device that is accessible by a voting server.

Another level of validation that disclosed embodiments may use to determine that a potential voter is an approved voter includes verifying that a communication device (e.g., a mobile telephone) that is local to (i.e., within a predetermined proximity) an MPR is associated with an approved voter. For example, if a potential voter John Doe wishes to vote in a national election, John Doe may attempt to vote using his MPR, which may be an STB he typically uses to access multimedia content including digital television, video on-demand movies, sporting events, and Internet content. Accordingly, John Doe may turn to a voting channel on the MPR, which accesses information from a voting server hosted by the multimedia content distribution network (e.g., an Internet protocol (IP) television network). John Doe may then be asked to enter login credentials which verify that he is, in fact, John Doe, or at least a person who knows John Doe's login credentials (e.g., a password, voter ID, or the like). If John Doe's login credentials are verified, his MPR may determine whether it is in local communication with John Doe's cellular telephone. For example, if his MPR and cellular telephone are Bluetooth enabled, a local communication link may be verified. Alternatively, if his MPR and cellular telephone are WiFi enabled, a local WiFi communication link may be verified. As a further means of validation, the MPR may report the existence and strength of the local communication link to the voting server. Depending on the settings of the voting server, a voting ballot may be provided to the MPR and consequently to John Doe if the login credentials are matched and local communication is verified. If further verification is needed by the voting server before providing the ballot, other means of validation may be employed.

As a further example means of validation, location information associated with John Doe's MPR and/or cellular telephone may be accessed and verified by the MPR and voting server. Some voting servers may require that John Doe is at home or another approved location in order to vote using an MPR. Accordingly, a voting server may verify that John Doe's MPR, while used for voting, is communicating over an approved communication link, such as a wireline associated with John Doe. Alternatively, if John Doe's cellular telephone is global positioning system (GPS) enabled, coordinates for his cellular telephone may be accessed by a voting server or his MPR to otherwise verify that John Doe is voting from an approved location. In operation, the voting server may access the GPS coordinates of John Doe's cellular telephone through a local communication link with the MPR or by requesting the information from his cellular network.

Therefore, if a voting server seeks to detect whether a potential voter who claims to be John Doe is properly voting, it may employ any of the above techniques for validation that the potential voter is John Doe. So if the voting server determines that a potential voter has correctly entered John Doe's voter credentials, determines that John Doe's cellular telephone is in local communication with an approved MPR associated with John Doe, determines that the approved MPR is using an approved line (e.g., an approved digital subscriber line) associated with John Doe, and determines that John Doe's cellular telephone indicates it is at an approved voting location (e.g., his home), the voting server may operate with the assumption that the potential voter is John Doe. Accordingly, the voting server may present John Doe with a ballot (e.g., a voting list) and accept input to select one or more elements from the ballot.

In some embodiments, post-voting activity may occur to inform John Doe of the voting that has taken place under his identity. For example, an e-mail, text message, voicemail, or other indication may be sent to a communication device or account (e.g., email account) associated with John Doe to inform him that voting has occurred under is identity. Some embodiments may also capture biometric data such as fingerprint data to verify the identity of a potential voter. A photograph may also be taken of a potential voter and stored for future reference in case there is a need to verify the identity of a voter. Disclosed embodiments may also verify whether John Doe has previously voted and prevent duplicate votes under his identity.

In addition to the techniques disclosed above, other voter identity verification techniques may also be employed with disclosed embodiments. For example, if the voting server discussed above receives a request from a potential voter who claims to be John Doe, the voting server may send a text message, voice message, or institute a telephone call to John Doe and request verification that John Doe is attempting to vote. Biometric data may be captured, voice recognition techniques may be employed, or other verification techniques may be employed during this step to accurately determine whether the potential voter is John Doe.

In this way, disclosed embodiments promote secure electronic voting that is remote from traditional polling places. Voting results may be audited, and recounts of votes may be done automatically by data processing systems (e.g., computers). While such secure voting may be employed for governmental elections, other uses of disclosed embodiments may not require such a high level of security. For example, if a reality television program or televised competition invites viewers to vote on contestants, a lower level of verification of voter identification may be employed. However, some combination of the above techniques may be used to verify or ensure that only an approved number of votes are received. In addition, the above techniques may be used to allow viewers to participate in interactive game shows that invite viewers to respond to questions (e.g., trivia questions) presented in real time. In such cases, a game show may employ a voting server that verifies that a single contestant is providing answers for the game show, and that contestants at different locations are not improperly competing under one voter identification.

Referring to FIG. 1, a block diagram illustrating selected elements of MPR 124 is presented. In the depicted embodiment, MPR 124 includes a processor 101 communicatively coupled to storage 110 via a shared bus 102. Storage 110 includes persistent media 135, main media 125, fixed media, removable media, magnetic media (e.g., magnetic hard disk 187), and semiconductor media. Storage 110 is operable to store instructions, data, or both. Storage 110, as shown, includes multiple sets or sequences of instructions, namely, operating system 169, GPS application 161, and ballot application 182.

Operating system 169 may be a Unix® or Unix-like operating system, a Windows® family operating system, or another suitable operating system. Ballot application 182 presents ballots to a voter in response to verifying the identity of the voter using disclosed techniques. Ballot application 182 includes or accesses ballot data containing, for example, the names of contestants or candidates that are presented as selectable elements within an on-screen ballot. Ballot application 182 may operate in conjunction with a remote ballot application, which may be hosted on an application server (e.g., voting server 173) or on a content delivery server of content provider 130, to facilitate receiving votes from validated users of MPR 124 in a secure fashion.

In operation, MPR 124 is enabled to receive votes from users who are validated as eligible voters using some combination of disclosed identity verification techniques. Users may use remote control device 177 to navigate to a channel or portal provided by content provider 130. A user (i.e., potential voter) may enter log-in credentials using remote control device 177 through a user interface presented on display 122.

Communication device data 117 may include identifiers for approved communication devices to permit voting via MPR 124. For example, communication device data 117 may store network identifiers for wireless telephony device 189 which is in local communication via local communication link 141 through wireless interface 135 with MPR 124. Local communication link 141 may be Bluetooth, WiFi, infrared, or another localized communication protocol. By verifying that wireless telephony device 189 is within a predetermined range of MPR 124, by verifying that wireless telephony device 189 is associated with an approved voter, and by assuming that the approved voter is in possession of wireless telephony device 189, disclosed systems may promote secure voting by verifying the identity of the approved voter.

MPR 124, as depicted in FIG. 1, further includes a network adapter 120 that interfaces MPR 124 to content provider 130. MPR 124 receives multimedia content such as television content from content provider 130. In embodiments suitable for use in IP based content delivery networks, MPR 124, as depicted in FIG. 1, may include an audio/video (A/V) decoder 137 that assembles payloads from a sequence or set of network packets into a stream of multimedia content. The stream of multimedia content may include audio information and video information and A/V decoder 137 may parse or segregate the two to generate a video stream 138 and an audio stream 136 as shown.

Video and audio streams 138 and 136, as output from A/V decoder 137, may include audio or video information that is compressed, encrypted, or both. A/V decoder 137 may employ any of various widely distributed video decoding algorithms including any of the Motion Pictures Expert Group (MPEG) standards, Windows Media Video (WMV) standards including WMV 9, which has been standardized as Video Codec-1 (VC-1) by the Society of Motion Picture and Television Engineers. Similarly A/V decoder 137 may employ any of various audio decoding algorithms including Dolby® Digital, Digital Theatre System (DTS) Coherent Acoustics, and Windows Media Audio (WMA). The video and audio streams 138 and 136 as shown in FIG. 1 are processed by A/V decoder 137 to a format that is compliant with display 122. Display 122 may comply with a National Television Systems Committee (NTSC), Phase Alternating Line (PAL) or any other suitable television standard. The video stream 138, in accordance with disclosed embodiments, includes a ballot with user selectable elements. For the visually impaired, audio stream 136 may also include ballot data that is selectable using audible user input or manual input provided to remote control device 177 over remote control interface 155. As shown, GPS satellite system 151 communicates wirelessly with MPR 124 through satellite interface 139. Satellite interface 139 may include a satellite dish, antenna, or other receiver for determining the location of MPR 124 to verify that it is in an approved voting location. Although satellite system 151 is shown as a single satellite, it should be understood that several more satellites may simultaneously communicate with MPR 124 to determine the location of MPR 124.

As shown, GPS satellite system 151 also communicates with wireless telephony device 189 to establish its location. This location may be relayed over communication link 141 to MPR 124 and then to voting server 173. If a user (i.e., potential voter) attempts to vote using MPR 124, voting server 173 may verify that mobile telephony device 189 is within a predetermined proximity (e.g., within 100 feet) of MPR 124 by verifying the existence of communication link 141. In addition, biometric data (e.g., iris data) for the user may be captured by biometric sensor 163 and provided to MPR 124 through biometric acquisition interface 153. The biometric data may be compared to user profiles 123, which contains a store of approved voter information, log in credentials, and the like.

If the existence of local communication link 141 is verified and if biometric acquisition interface 153 receives data that appears associated with an approved voter, voting server 173 may verify that MPR 124 is communicating with content provider 130 over an approved communication path. To do this, voting server 173 may access LIDB 167 and verify that communication path 165 is associated with an approved voter that is also associated with mobile telephony device 189 and MPR 124. If communication path 165 is verified as associated with an approved voter, MPR 124 may encode within video signal 138 and/or audio signal 136 ballot 196, which contains selectable elements.

Figure 2:
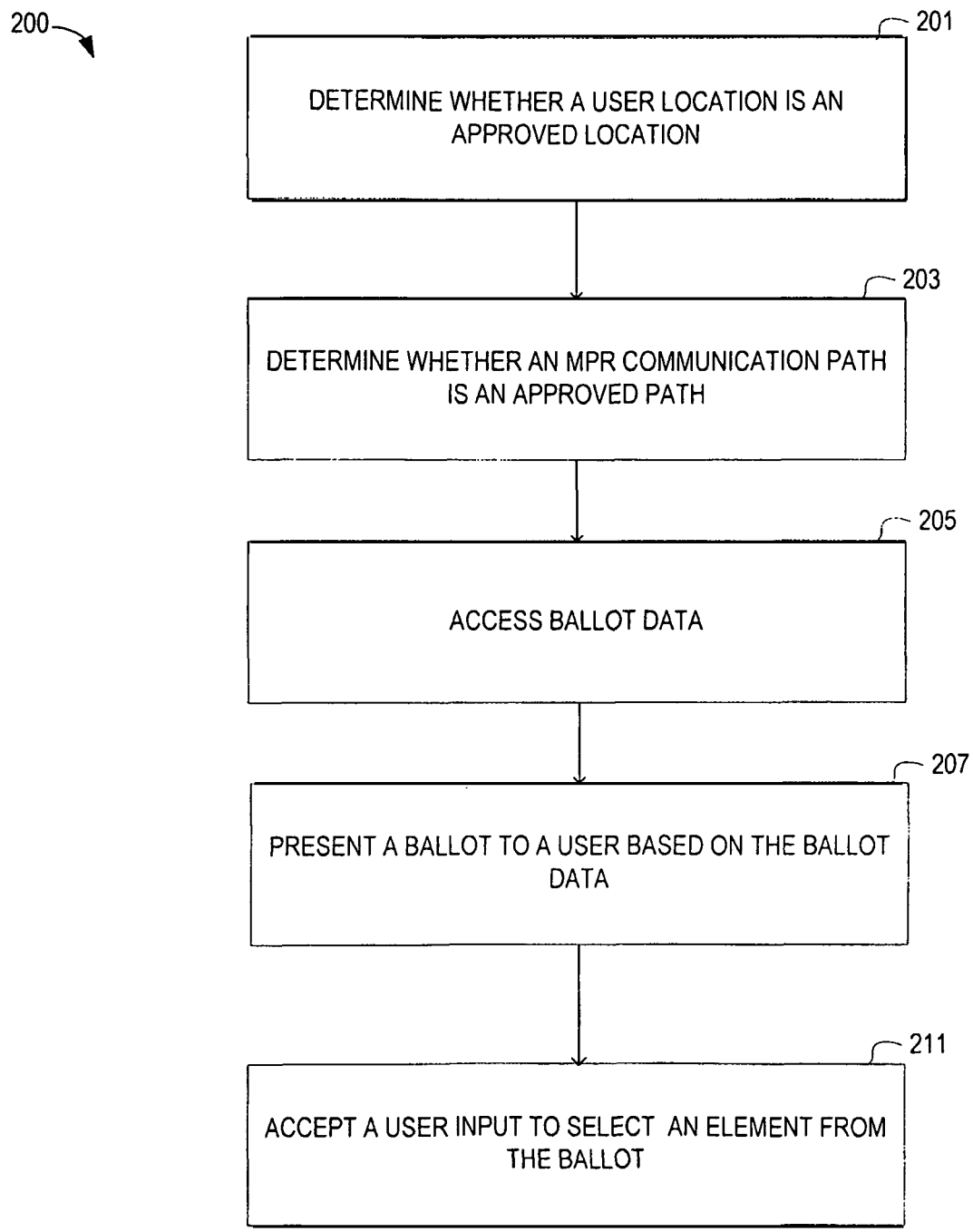
FIG. 2 depicts selected elements of a methodology for conducting secure voting in accordance with disclosed embodiments.

Referring now to FIG. 2, a methodology 200 is illustrated for conducting secure voting in accordance with disclosed embodiments. Methodology 200 may be carried out by a combination of MPR 124 (FIG. 1) and voting server 173 (FIG. 1). As shown, methodology 200 includes determining (block 201) whether a user location is an approved location and determining (block 203) whether an MPR communication path is an approved path. If the user location is an approved location and the MPR communication path is an approved path, methodology 200 includes accessing (block 205) ballot data, presenting (block 207) a ballot to a user based on the ballot data, and accepting (block 211) a user input to select an element from the ballot.

Some embodiments of methodology 200 may also include determining whether a user identity is valid, such as by receiving biometric data from a user. In addition, determining whether a user identity is valid may include determining whether received textual data is from an approved mobile telephony device. Methodology 200 may optionally include other elements such as determining whether an MPR location is an approved voting location. This determination may be made by receiving an indication that an approved mobile telephony device is within a predetermined proximity of the MPR. A predetermined proximity, for example, may be indicated by receiving a Bluetooth signal, a WiFi signal, an infrared signal, a radio signal, an acoustic signal or other type of signal that is typically transmitted over a limited distance. In some embodiments, a local communication link between an MPR and an approved mobile telephony device may indicate that the approved mobile telephony device is local to the MPR. For example, the mobile telephony device may transmit to or receive from the MPR a Bluetooth protocol signal. In some embodiments, the mobile telephony device transmits to the MPR a Bluetooth protocol signal that includes GPS data indicating the current or last verified coordinates of the mobile telephony device. If the current or last verified coordinates of the mobile telephony device indicate that it is at or in close proximity to an approved voting location, and a local communication link is verified between the MPR and the mobile telephony device, a voting server may conclude that an approved voter is voting from an approved voting location. In such embodiments, the approved voter is presented with a ballot and provided an opportunity to vote. Voters may also be presented an opportunity to provide write-in candidates by entering new elements to a ballot.

Figure 3:
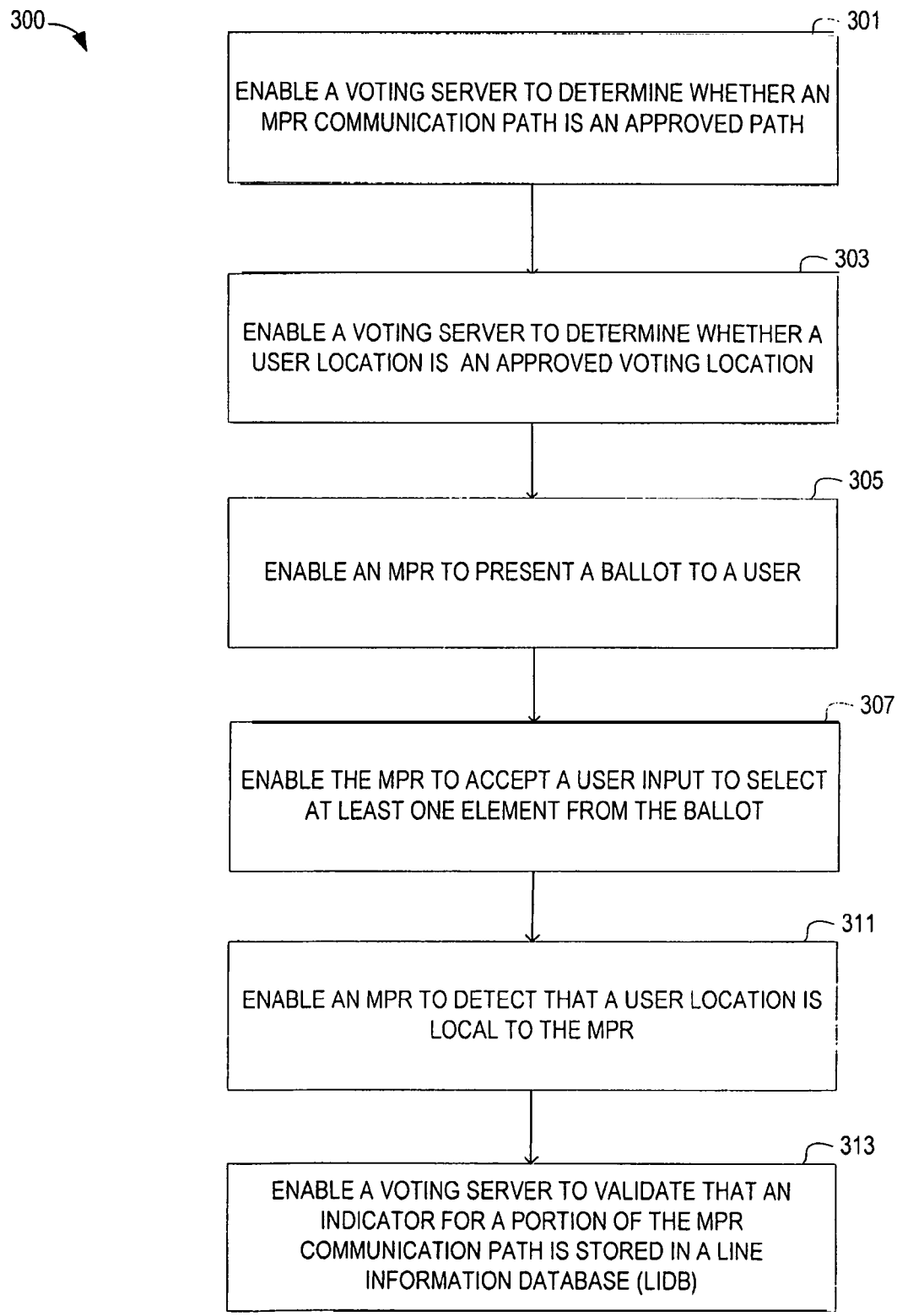
FIG. 3 depicts selected elements of a service for conducting secure voting in accordance with disclosed embodiments.

FIG. 3 depicts selected elements of an embodied service 300 for accepting votes from an MPR. As shown, the service 300 includes enabling a voting server to determine (block 301) whether an MPR communication path is an approved path and enabling a voting server to determine (block 303) whether a user location is an approved voting location. If the MPR communication path is an approved path and the user location is an approved voting location, service 300 further includes enabling (block 305) an MPR to present a ballot to a user and enabling (block 307) the MPR to accept a user input to select at least one element from the ballot. Optionally, service 300 may include enabling (block 311) an MPR to detect that a user location is local to the MPR and enabling (block 313) a voting server to validate that an indicator for a portion of the MPR communication path is stored in an LIDB.

While the disclosed subject matter has been described in connection with one or more embodiments, the disclosed embodiments are not intended to limit the subject matter of the claims to the particular forms set forth. On the contrary, disclosed embodiments are intended to encompass alternatives, modifications and equivalents.

What is claimed is:

1. A multimedia processing resource comprising:
   a network interface for receiving television content from a television content provider and for communicating with the content provider over a wireline communication path associated with a line information data base identifier;
   a video decoder for decoding the television content for display on a television display;
   a wireless interface for receiving a local wireless signal from a mobile telephone to determine whether a user location indicative of a location of a user is an approved location;
   a ballot application module stored on a tangible computer readable medium, wherein the ballot application module is for presenting a ballot to the user by displaying the ballot on the television display responsive to determining that the user location and the wireline communication path are approved; and
   a remote control interface for accepting a remote control signal from a remote control device, the remote control signal indicative of a user input, to select an element from the ballot;
   wherein the television content is received from the television content provider via a wireline network.

2. The multimedia processing resource of claim 1, further comprising:
   a satellite interface for determining whether a location of the multimedia processing resource is the approved location.

3. The multimedia processing resource of claim 1, further comprising:
   a user profile module for verifying an identity of the user.

4. The multimedia processing resource of claim 1, further comprising:
   a communication device data module for verifying whether a mobile telephone local to the multimedia processing resource is an approved device.

5. The multimedia processing resource of claim 1, wherein the multimedia processing resource is a set top box operable to process multimedia content.

6. A voting method, comprising:
   receiving, by a multimedia processing resource, television content from a television content provider via a wireline network;
   communicating with the television content provider over a wireline communication path associated with a line information data base identifier;
   decoding the television content for display on a television display;
   responsive to receiving, with the multimedia processing resource, a local wireless signal from a mobile telephone, determining whether a user location indicative of a location of a user is an approved location;
   presenting a ballot to the user by displaying the ballot on the television display responsive to determining that the user location and the wireline communication path are approved; and
   accepting a remote control signal from a remote control device, the remote control signal indicative of a user input, to select an element from the ballot;
   wherein the television content is received from the television content provider via a wireline network.

7. The method of claim 6, further comprising:
   a satellite interface for determining whether a location of the multimedia processing resource is the approved location.

8. The method of claim 6, further comprising:
   verifying an identity of the user with a user profile model.

9. The method of claim 6, further comprising:
   a communication device data module for verifying whether a mobile telephone local to the multimedia processing resource is an approved device.

10. The multimedia processing resource of claim 9, wherein the multimedia processing resource is a set top box operable to process multimedia content.

* * * * *